June 8, 1926.
W. H. COOKE
DUMPING WAGON
Filed May 3, 1923
1,588,311
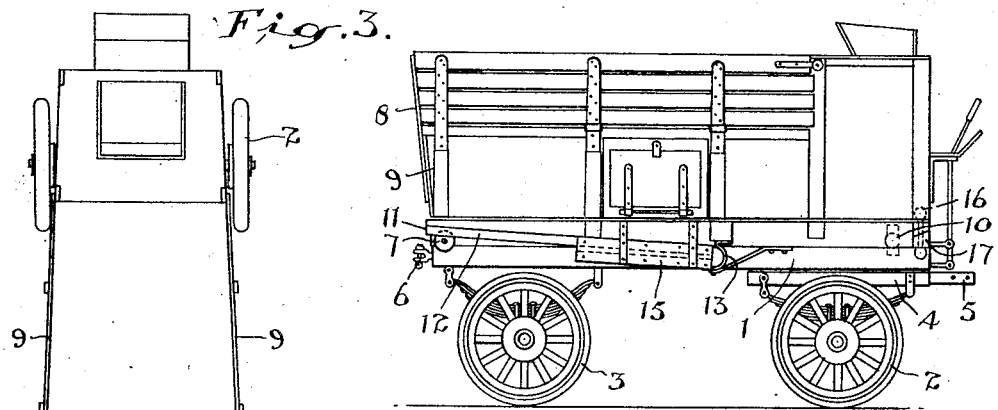
Fig. 3.
Fig. 1.
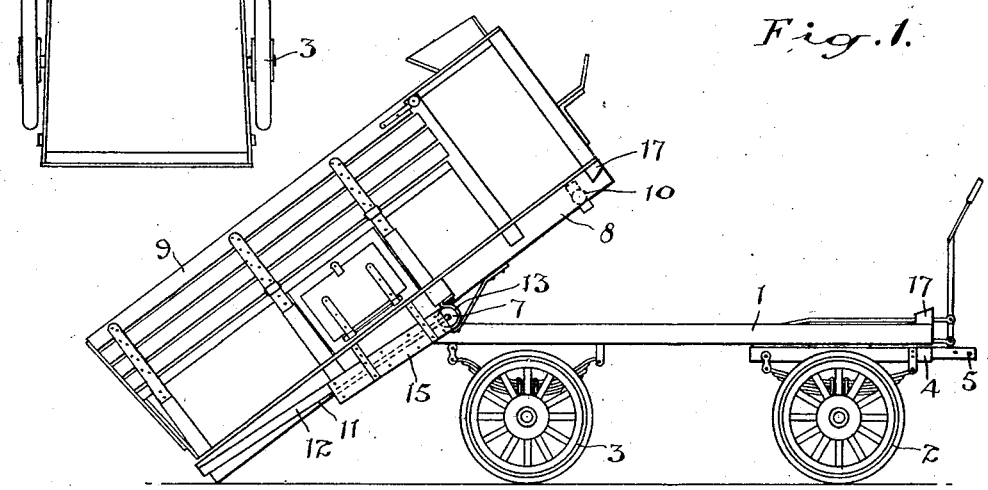
Fig. 2.
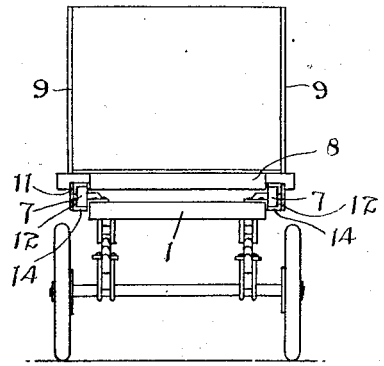
Fig. 4.
Inventor.
William H. Cooke
by H. J. S. Dennison
att.

Patented June 8, 1926.

1,588,311

UNITED STATES PATENT OFFICE.

WILLIAM H. COOKE, OF TORONTO, ONTARIO, CANADA, ASSIGNOR, BY MESNE ASSIGNMENTS, TO CONVERTIBLE WAGON TRAILERS, INC., OF BUFFALO, NEW YORK, A CORPORATION OF NEW YORK.

DUMPING WAGON.

Application filed May 3, 1923. Serial No. 636,408.

The principal objects of the invention are, to provide a dumping wagon particularly adapted for use in municipal refuse collection, which will avoid the dangers incident to the use of such wagons through the body disengaging from the truck, and further to devise a structure which will readily release the refuse and which may be utilized as an individual wagon or as a trailer.

The principal feature of the invention consists in the novel arrangement of roller supports at the rear end of the truck and of the guards on the body, whereby the body is securely held from tilting and lifting clear to disengage from the truck on being dumped and in the rearward flare of the sides of the body to allow the contents to readily clear.

In the drawings, Figure 1 is a side elevational view of my improved wagon.

Figure 2 is a side elevation showing the body in the dumping position.

Figure 3 is a top plan view of the wagon.

Figure 4 is a rear end elevational view.

In the collection of municipal refuse individual operable wagons are desirable and the present invention has been devised to meet the requirements of such a wagon which may be converted to a trailer and which will facilitate the release or discharge of the refuse therefrom.

In the construction shown the truck frame 1 is preferably of a rigid steel construction supported upon the wheels 2 and 3. This frame is provided with a swivel truck 4 at the front with a tongue connection 5 and a rear draw bar connection 6 which enables the wagon being converted into a trailer.

Upon the rear end of the frame, at either side, are mounted the rollers 7. The body 8 is preferably constructed so that the sides 9 flare to the rear, consequently the refuse which is usually of an expansible nature will not jam but will readily release itself upon the tilting of the body rearwardly.

The body is supported at the front upon rollers 10 and at the rear end the body rests upon the rollers 7, being engaged by the angle bar tracks 11 secured to the body and preferably sloping downwardly and forwardly.

The outward flanges 12 engage the sides of the rollers and guide the body in its backward travel. At the forward end of the tracks 11 are arranged looped structures 13 formed of steel bars which are adapted to engage the rollers 7 to limit the backward movement of the body.

The guide loops 13 extend well underneath the rollers and bottom flanges 14 in the form of angle irons are secured to side plates 15 which form positive guides to prevent the body dumping off the rear rollers while the body is being tilted.

Many serious accidents have occurred in the use of dumping wagons where the tail end of the body striking an obstruction tilts the body sideways, throwing it clear of the truck and causing it to double over on the workman or to tilt to clear the truck and then roll down an embankment. The construction of trackways with the under looped portions to engage the rollers definitely overcomes this dangerous feature.

The body when in its normal position on the truck is secured from longitudinal movement by the arrangement of suitable fastening pins 16 passing through the meeting rails 17.

What I claim as my invention is:—

In a dumping wagon, the combination with the truck frame, of rollers supported in a fixed bearing at the rear of said frame, a body having guides thereunder resting upon said rollers and extending rearwardly and angularly upward from a point intermediate of the length of the body, said guides being formed with flanges extending to the outside of the rollers, said guides having return ends extending beneath the rollers to hold the body from disengagement from the rollers, and rollers on the forward end of said body.

WILLIAM H. COOKE.